March 30, 1937.    P. R. ZINSER    2,075,689
DOOR PANEL ASSEMBLY
Filed May 6, 1933
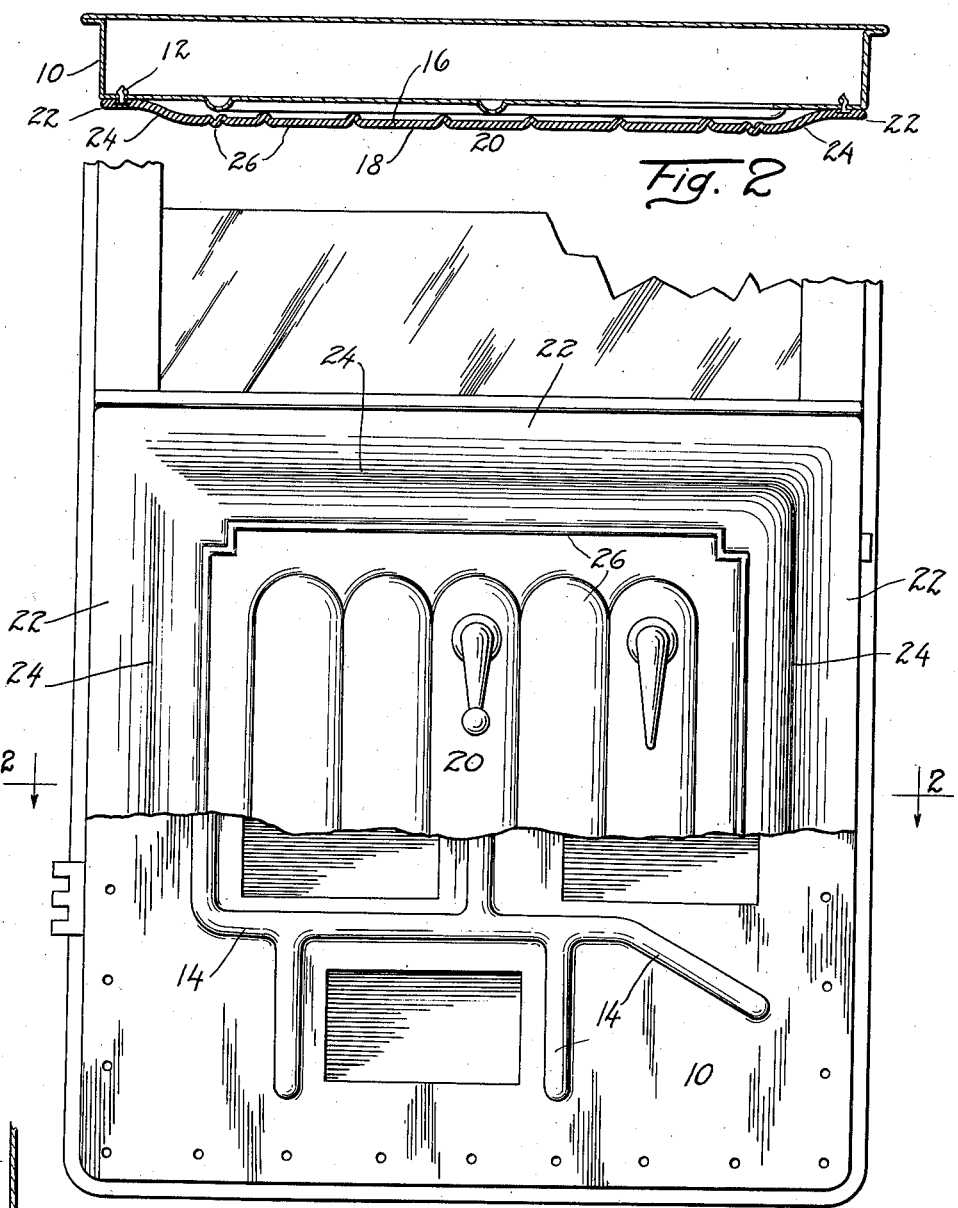
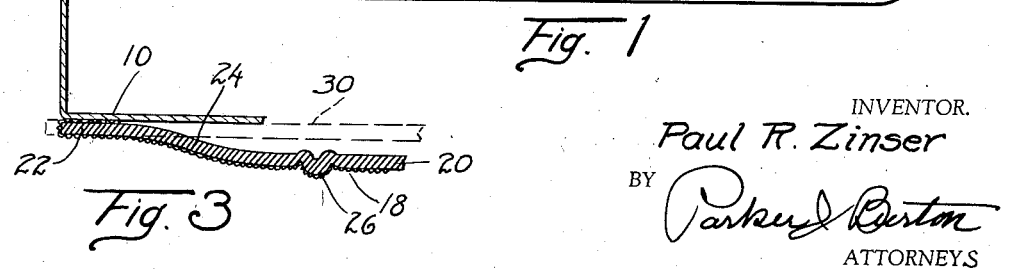
INVENTOR.
Paul R. Zinser
BY
ATTORNEYS Patented Mar. 30, 1937

2,075,689

UNITED STATES PATENT OFFICE 2,075,689

DOOR PANEL ASSEMBLY

Paul R. Zinser, Detroit, Mich., assignor to Woodall Industries Incorporated, Detroit, Mich., a corporation of Michigan Application May 6, 1933, Serial No. 669,763

3 Claims. (Cl. 45—138)

This invention relates to improvements in automobile body construction and particularly to improvements in interior panel assemblies such as are used on automobile doors or the like and to an improved trim panel adapted to such use and to an improved method of its manufacture.

An object is to provide such an assembly, wherein a trim panel formed of a flat sheet of deformable material, such as thermoplastic composition fiber board, is covered on one side with upholstery cloth or other suitable finishing material, and is so shaped and formed as to provide a finished panel, which though simple and inexpensive, has the rich and soft appearance of an expensive upholstered product, and which is adapted to seat snugly and securely against the marginal supporting surface of the body framework and at the same time house the irregularities of the supporting frame.

This improved panel has an embossed central crown portion, which is so shaped as to present the appearance of expensive tufted upholstery, and which is offset laterally a flat marginal portion and separated therefrom by an intermediate ogee border portion whereby the strain put upon the crown portion, through the embossment thereof, is not carried into the flat marginal seating portion of the panel to distort or otherwise affect the same, and such marginal portion is strengthened and rigidified so as to assume and maintain a desired contour to seat closely against the seating portion of the body framework.

The ogee curves of the border permit the desired decorative embossments of the crown to be imparted thereto without the same influencing or affecting the desired contour imposed upon the marginal portion of the panel which seats against and is secured to the framework of the body and permits such marginal portion to be drawn snugly against the opposed supporting marginal portion of the frame without subjecting the panel to distortion or strain which would tend to loosen the fastening means employed.

Other objects and advantages and meritorious features will more fully appear from the following description, appended claims, and accompanying drawing, wherein:

Figure 1 is an elevation of a section of a door frame showing my improved panel, in fragmentary form, attached thereto, Figure 2 is a horizontal sectional view taken on line 2—2 of Figure 1, and Figure 3 is a cross sectional view through my panel prior to the stamping operation showing the oversize relationship with respect to the frame upon which it is to seat.

In automobile interior trim it is common practice to provide fabric covered trim panels which are generally formed of some composition fiber board covered with fabric and provided with wadding to give an upholstery effect. These panels are secured to the interior framework of the body by nails, clips, or the like. Much of the framework of an automobile body is now formed of stamped sheet metal. The sheet metal framework is not regular and is not flat in character because to accommodate for various appearances and to render the same rigid and prevent drumming, it is embossed with various reinforcing channels and the like. The positioning of the cardboard thereover is therefore accompanied by a bending or flexing of the board to fit over the framework and when the edges are secured down the panel is placed under constraint. This bending of the fiber board over the protuberances of the frame results in distortion and warping of the board and to eliminate this unsightly appearance and also to give a soft upholstery appearance. It is common practice to place a wadding between the cloth covering and the foundation board. This merely minimizes the unsightly appearance of the structure. It does not relieve the panel of the strain to which it is subjected.

My improvement relates to the provision of a panel which possesses the rich upholstered appearance and is yet of a simple and inexpensive construction. In addition the panel is so shaped and formed that it seats snugly along its marginal seating portion against the framework of the body and is provided with a central expanse or crown portion which houses in the protruding parts of the frame so that in the positioning of the panel upon its support it is not subjected to flexing or bending and is therefore not under strain or tension when attached but seats firmly and snugly against the support. The construction further is of such a character that the seating margin of the panel is held flat and rigid by the provision of an ogee border about the crown which produces and intends to maintain a flat marginal seating portion for securement to the frame.

In my improved construction let 10 indicate an automobile door frame formed of sheet metal which is provided with apertures through which fasteners 12 may be inserted to secure a trim panel thereto. This frame 10 is reinforced and stiffened by corrugations and channels 14 which also include mountings for various operating devices such as handles for the door, lock and window regulators, so that the complete framework presents throughout its interior portion an irregular contour. The marginal portion is flat so as to afford a seat for the trim panel. This marginal portion is provided with some means to receive fasteners. As shown here it is provided with apertures to receive spring clip like fasteners which are in common use.

My trim panel comprises a fiber composition board foundation 16 provided with an upholstery cloth covering 18 over its outer face which is turned over the edges onto the inner face. The foundation board with the covering thereon is subjected to a stamping operation which produces a crown portion 20, a flat marginal seating portion 22 and an intermediate curved border portion 24 which as here shown is shaped after the fashion of an ogee curve that offsets the crown and flat marginal portions laterally with respect to each other so that the crown portion houses in the irregular central contour of the panel while permitting the flat marginal portion thereof to seat upon the provided portion of the frame which receives the same. The interior crown portion is embossed as at 26 to represent upholstery tufting. This embossment gives the outer surface the effect of a surface produced by upholstery cloth stretched over wadding and held down against the base as by tufting. This produces a rich and soft appearance very similar to expensive upholstery work.

The general contour of the panel in the provision of the central crown portion offset the flat marginal portion not only provides a housing for the irregular central portion of the framework but it offsets the flat marginal seating portion in such a manner that it is rendered substantially flat and rigid and held to such shape by the curved intermediate portion that separates the flat margin from the crown so that the embossment of the crown which subjects the panel structure to distortion does not extend into or affect the flat marginal portion and does not tend to warp the same but leaves it flat to seat against the seating portion of the frame. The panel when placed on the frame seats snugly against the seated portion of the frame and is connected therewith without being placed under any tension.

In accomplishing this object a flat cardboard panel 30 is cut as shown in Figure 3 slightly oversize the frame 10 upon which it is to seat and is provided with an upholstery covering. It is then embossed and stamped to shape and as a result of this embossing and stamping operation it is brought down to a size where the flat marginal portion is of a size to seat against the flat marginal portion of the supporting framework. The panel following its shaping is shown in full line. The frame is also shown in full line. The panel prior to shaping and of the oversize dimension is shown in dotted line at 30.

What I claim:

1. A trim panel formed of thermoplastic sheet material covered on one side with upholstery cloth and having a flat marginal portion, a central crown portion embossed to represent upholstery tufting separated from the flat marginal portion by an intermediate ogee border portion offsetting the crown portion laterally with respect to said marginal portion.

2. In combination with a support for a panel having a flat marginal panel seating portion and an irregular central portion, a trim panel therefor comprising a central crown portion embossed to represent upholstery tufting and provided with a border portion extending outwardly and laterally therefrom, said border portion terminating in a flat marginal portion separated from the crown portion and held substantially flat and rigid by a laterally extending ogee curved portion, and means securing the flat marginal portion of the panel to the flat margin of the support.

3. In combination with a frame for supporting a panel having a flat border and an irregular central section containing bumped out portions, a trim panel therefor having a flat border seated against and secured to the flat border of the frame, the central section of the panel being offset laterally outwardly from the border thereof to extend over said bumped out portions of the frame in unstrained condition, said panel provided with an ogee curved portion intermediate its flat border and the offset central section providing the panel with a line of flexibility adjacent the border for absorbing the buckling and warping strains of the panel without affecting its surface appearance.

PAUL R. ZINSER.